United States Patent
Gefen et al.

(10) Patent No.: US 11,132,288 B2
(45) Date of Patent: Sep. 28, 2021

(54) DATA-DRIVEN SCHEDULING OF AUTOMATED SOFTWARE PROGRAM TEST SUITES

(71) Applicant: EMC IP Holding Company LLC, Hopkinton, MA (US)

(72) Inventors: Avitan Gefen, Tel Aviv (IL); Omer Sagi, Mazkeret Batya (IL); Ran Taig, Beer Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 124 days.

(21) Appl. No.: 15/963,413

(22) Filed: Apr. 26, 2018

(65) Prior Publication Data
US 2019/0332523 A1 Oct. 31, 2019

(51) Int. Cl.
*G06F 11/36* (2006.01)
*G06N 20/00* (2019.01)

(52) U.S. Cl.
CPC ......... *G06F 11/3688* (2013.01); *G06N 20/00* (2019.01); *G06F 11/3668* (2013.01)

(58) Field of Classification Search
CPC .. G06F 11/3688; G06F 11/3668; G06N 20/00
See application file for complete search history.

(56) References Cited

U.S. PATENT DOCUMENTS

| | | | | |
|---|---|---|---|---|
| 7,937,622 | B2* | 5/2011 | Mehrotra | G06F 11/3684 714/25 |
| 9,201,768 | B1* | 12/2015 | Alon | G06F 11/3672 |
| 9,514,034 | B1* | 12/2016 | Griffin | G06F 11/3688 |
| 2007/0094542 | A1* | 4/2007 | Bartucca | G06F 11/3672 714/38.1 |
| 2012/0266023 | A1* | 10/2012 | Brown | G06F 11/3664 714/32 |
| 2013/0007525 | A1* | 1/2013 | del Rosario | G06F 11/263 714/34 |
| 2013/0042222 | A1* | 2/2013 | Maddela | G06F 11/3684 717/124 |
| 2015/0007140 | A1* | 1/2015 | Boshernitsan | G06F 11/368 717/124 |
| 2016/0259716 | A1* | 9/2016 | Grant | G06F 11/3688 |
| 2018/0052764 | A1* | 2/2018 | Kaser | G06F 11/3692 |

OTHER PUBLICATIONS

Wikipedia's Bayseian Probability historical version published Feb. 20, 2018 https://en.wikipedia.org/w/index.php?title=Bayesian_probability&oldid=826724126 (Year: 2018).*

* cited by examiner

*Primary Examiner* — Joseph O Schell
(74) *Attorney, Agent, or Firm* — Ryan, Mason & Lewis, LLP

(57) ABSTRACT

Techniques are provided for data-driven scheduling of automated software program test suites. An exemplary method comprises: obtaining a plurality of test cases that test software programs; obtaining a failure likelihood for each of the plurality of test cases; and scheduling the test cases in an order based on the failure likelihoods. Generally, test cases that are more likely to fail are scheduled before test cases that are less likely to fail. Dependencies and/or priorities among the plurality of test cases are also optionally obtained and the scheduling of the test cases is based on the dependencies and/or priorities. The dependencies among the plurality of test cases comprise, for example, an indication of whether a given test case constrains one or more additional test cases.

20 Claims, 5 Drawing Sheets

INPUT:

T – set of [N] test cases {$t_1, t_2, t_3....t_N$}

C – set of [M] constraints {$c_1, c_2, c_3.....c_M$}

PARAMETER INITIALIZATION:

P – set of failure probabilities, corresponding to T {$P_{t1}, P_{t2}... P_{tN}$}

TS – the test suite, initialized as empty list of test cases

V – a list of valid test cases, i.e. test cases that can be added to the end of the TS.

Where valid test case defined as:
1. test case that doesn't constrain any other test case
2. Test case that doesn't constrain any test that haven't been added to TS

ALGORITHM:

WHILE |TS| < |T|:
- added_case = test case [$t_n$] with minimum [$p_{tn}$] value out of [V]
- add [added_case] to the beginning of TS
- update [V] accordingly

OUTPUT:

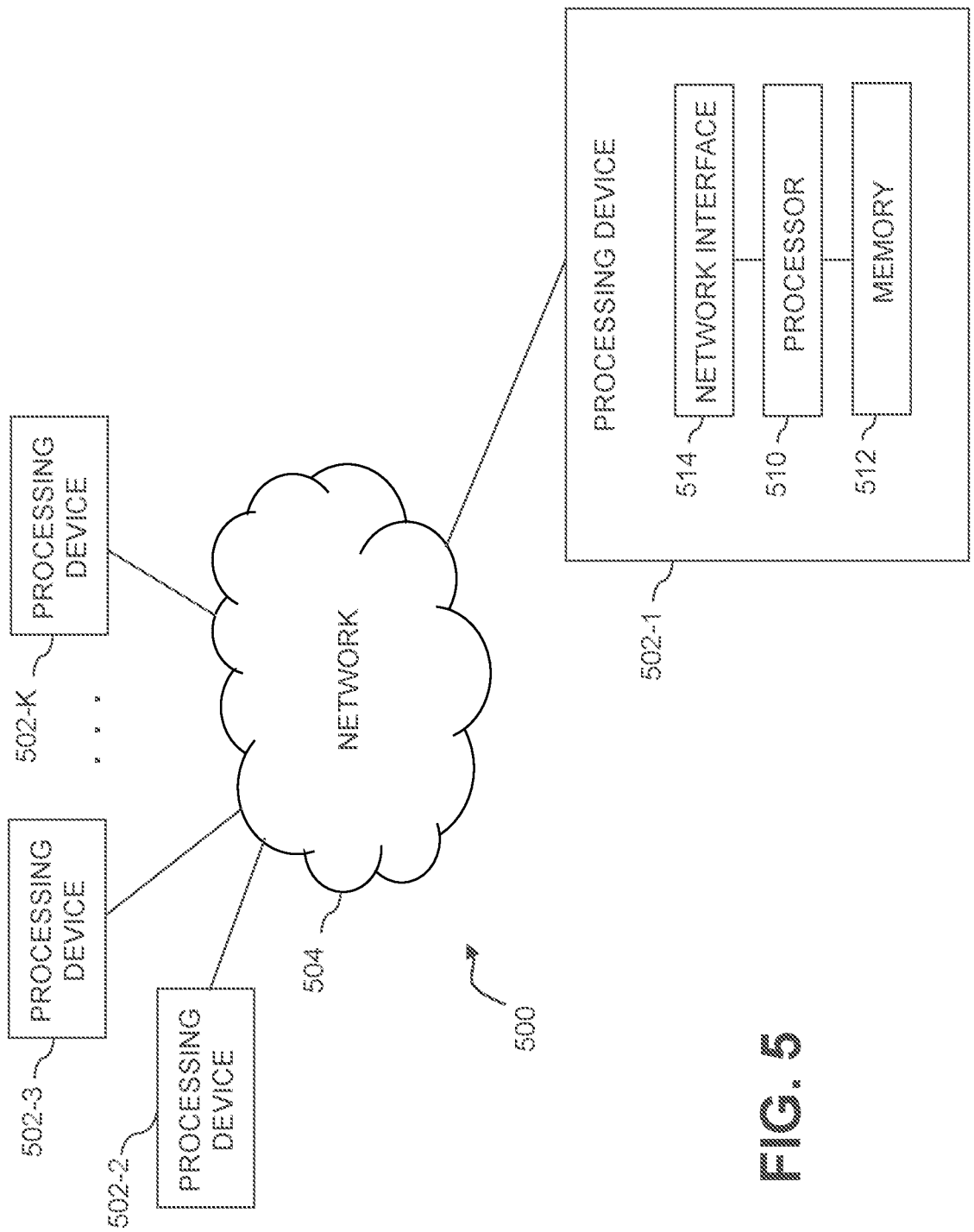

DATA-DRIVEN SCHEDULING OF AUTOMATED SOFTWARE PROGRAM TEST SUITES

FIELD

The field relates generally to information processing systems.

BACKGROUND

A test suite is a collection of test cases used to test a software program to illustrate that the software program has some specified set of behaviors. A test suite is usually considered to have failed if one or more of the included individual test cases have failed. In order to reduce the usage of software testing resources (e.g., engineers and computing resources), it is desirable to have a test suite fail as soon as possible.

A need therefore exists for techniques for predicting which test cases of a given test suite are more likely to fail.

SUMMARY

Illustrative embodiments of the present disclosure provide for data-driven scheduling of automated software program test suites. In one embodiment, an exemplary method comprises: obtaining a plurality of test cases that test one or more software programs; obtaining a failure likelihood for each of the plurality of test cases; and scheduling one or more of the test cases in an order based on the failure likelihoods. Generally, test cases that are more likely to fail are scheduled before test cases that are less likely to fail.

In some embodiments, dependencies and/or priorities among the plurality of test cases are also obtained and the scheduling of the test cases is based on the dependencies and/or priorities. The dependencies among the plurality of test cases comprise, for example, an indication of whether a given test case constrains one or more additional test cases.

Other illustrative embodiments include, without limitation, apparatus, systems, methods and computer program products comprising processor-readable storage media.

BRIEF DESCRIPTION OF THE DRAWINGS

FIG. 3 illustrates exemplary pseudo code for a data-driven software test suites scheduling process, according to one embodiment of the disclosure;

FIG. 5 illustrates another exemplary processing platform that may be used to implement at least a portion of one or more embodiments of the disclosure.

DETAILED DESCRIPTION

Figure 1:
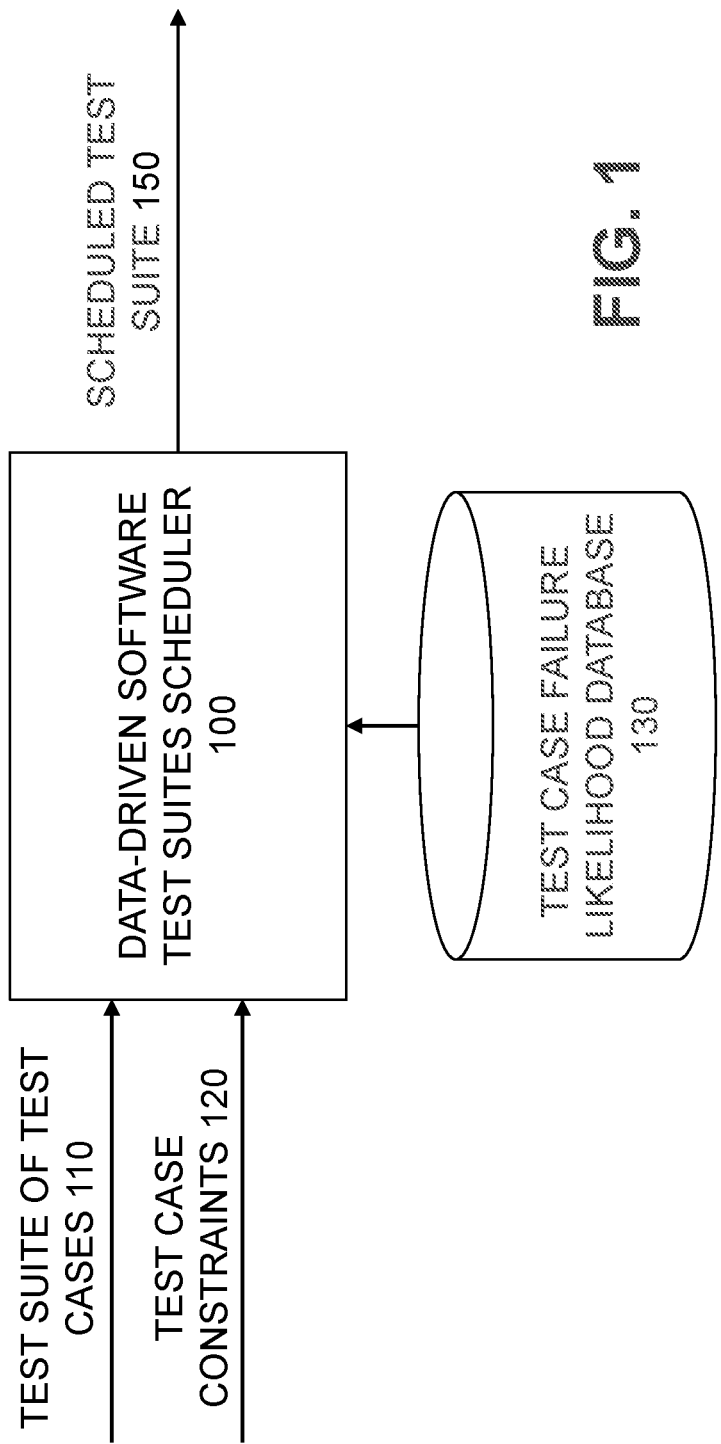
FIG. 1 illustrates an exemplary data-driven software test suites scheduler, according to an embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for data-driven scheduling of automated software program test suites.

In one or more embodiments, a data-driven solution is provided that enables a faster identification of failed test suites by prioritizing test cases that are more likely to fail when scheduling a test suite.

In some embodiments, machine learning methods are leveraged to assess the failure likelihood of a test case using historical runs of test suites and then to automatically schedule the test suite based on these failure likelihoods, such that failure detection time is reduced. The failure time predictions allow the test suite to be scheduled in a way that reduces execution time, as failures, if they occur, are expected to happen faster, allowing for a quicker reboot of the test process. The disclosed techniques for data-driven scheduling of automated software program test suites can be used, for example, by software Quality Assurance teams to increase test planning efficiency, from the perspective of execution time, as well as computational resources.

In at least one embodiment, the disclosed data-driven approach leverages machine learning approaches and existing data collected on past tests to determine an efficient test plan going forward. The existing data from past tests comprises data related to timing, success and setting of the previously executed tests.

In one or more embodiments, a data-driven software test suites scheduler comprises (i) a probabilistic engine that analyzes past test data and uses Bayesian methods to compute prior and posterior failure probabilities of each specific test case; and (ii) an integration component that integrates the calculated probabilities with constraints predefined by the user towards reducing the expected time to detect the first failed test case in the test suite.

The traditional approach for scheduling test cases within a test suite is basically a manual arrangement of the test cases, determined, for example, by software testers who manually set the priorities among the different test cases. There are various technical and conceptual problems and challenges with this approach as described herein.

Consider a certain test suite that contains only two test cases A and B, with the same duration times and different likelihoods to fail. In particular, test case A has an expected duration time of 30 minutes, and a failure probability of 0.99, while test case B also has an expected duration time of 30 minutes, but a failure probability of 0.

If test B is prioritized above test A at this extreme setting, it is most likely that the entire test suite will run for more than 30 minutes before the test suite is identified as failed. The decision in this scenario would be to prioritize case A over B, so that the test suite will be identified as failed earlier and the corresponding testing resources, such as CPU (central processing unit), RAM (random access memory) and idle testers (e.g., testers that might have been available during the unnecessary execution time) would be free. With current techniques, cases are not prioritized in accordance with their failure probability and therefore, resources are not well utilized.

Test suites often run in the background while software testers perform their ongoing tasks. However, there are many cases in which test suites serve as a bottleneck in the development process. For example: assuming that a Research and Development (R&D) team wants to move to a next development cycle, while it depends on the result of a given test suite, then the R&D team will want to know as soon as possible whether this test suite has passed or failed. An early detection of the failure would precede the work on required revisions.

Data-Driven Software Test Suites Scheduling

As noted above, in one or more embodiments, a data-driven scheduler is provided for scheduling multiple test cases within test suites based on the likelihood of test cases to be failed. In some embodiments, a test suite is a container that has a set of tests that help testers in executing and reporting the test execution status. A test case can be added to multiple test suites and test plans. After creating a test plan, test suites are created which in turn can have any number of tests. Test suites are created based on the cycle or based on the scope of the tested software. Within a complex software testing environment, for example, smart scheduling of the different test suites over the testing resource is highly important and can bring significant savings in time spent and computational resources involved.

FIG. 1 illustrates an exemplary data-driven software test suites scheduler 100, according to an embodiment of the disclosure. As shown in FIG. 1, the exemplary data-driven software test suites scheduler 100 takes a set of test cases 110 that will be run as a test suite and a set of test constraints 120 comprising interdependencies and/or priorities among the test cases in the set 110 (e.g., which test cases should be run before additional test cases).

The exemplary data-driven software test suites scheduler 100 obtains failure likelihoods for the test cases from a test case failure likelihood database 130. The exemplary data-driven software test suites scheduler 100 generates a scheduled test suite 150 for which the scheduling aims to reduce the time until a first failed test case is detected. In one or more embodiments, the scheduled test suite 150 comprises an ordering of the test cases in the test suite 110, based on the failure likelihoods.

In some embodiments, for each test case, a likelihood of being failed is estimated by assuming failure is a binomially distributed variable. Assuming a binomial distribution, the common estimator for the failure probability is given as follows:

$$(\text{\# of failed runs})/(\text{total \# of runs}). \quad (1)$$

The exemplary data-driven software test suites scheduler 100 processes all the above-mentioned input values 110, 120, 130 in order to provide the scheduled test suite 150. Generally, in some embodiments, at each iteration, the exemplary data-driven software test suites scheduler 100 selects the test case out of the test suite of test cases 110 that does not constrain any other test cases in the test suite 110, based on the likelihood to fail. The selected test case is inserted into the beginning of the returned scheduled test suite 150.

The common estimator for the failure probability, as defined by Equation (1) does not weight the number of prior runs for each test case. For example, test case A that had one failed run out of two runs will have the same failure probability value as test case B that failed 50 times out of 100 runs. Thus, in some embodiments, a Bayesian inference is used to generate a more reliable estimator. In Bayesian inference, the beta distribution is the prior probability distribution for the binomial distribution. More specifically, given a new test case, its failure probability is estimated to be:

$$(\alpha+k)/(\beta+n), \quad (2)$$

where k is the number of observed failed runs; n is the total number of test case runs over the different test suites 110; and $\alpha$ and $\beta$ are hyper-parameters that can be configured by the user.

In one or more embodiments, the hyper-parameters can be configured using a manual configuration to common values (e.g. $\alpha=1$, $\beta=2$); or by conducting a grid-search using a dataset of past test suites to find values of $\alpha$ and $\beta$ that substantially minimize the run-time over all test suites 110.

Figure 2:
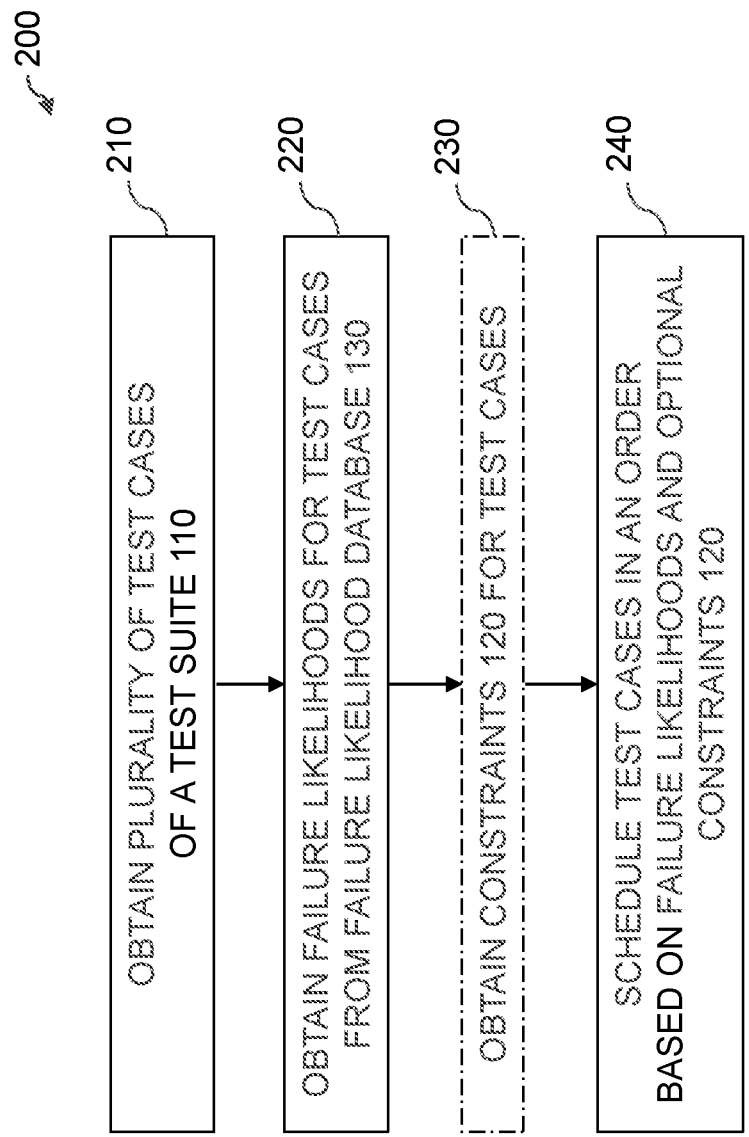
FIG. 2 is a flow chart illustrating an exemplary implementation of a data-driven software test suites scheduling process, according to some embodiments of the disclosure.

FIG. 2 is a flow chart illustrating an exemplary implementation of a data-driven software test suites scheduling process 200, according to some embodiments of the disclosure. As shown in FIG. 2, the exemplary data-driven software test suites scheduling process 200 initially obtains a plurality of test cases of a test suite during step 210. Thereafter, the exemplary data-driven software test suites scheduling process 200 obtains the failure likelihoods for the test cases during step 220 from the test case failure likelihood database 130.

During step 230, the data-driven software test suites scheduling process 200 optionally obtains a set of constraints 120 (e.g., interdependencies and/or priorities) for the test cases in the test suite 110. Finally, during step 240, the data-driven software test suites scheduling process 200 schedules the test cases in the test suite 110 in an order based on the failure likelihoods and, optionally, on the constraints 120.

In some embodiments, the scheduling is further based on (i) test cases that were already scheduled and/or (ii) portions of the software program that were modified.

FIG. 3 illustrates exemplary pseudo code for a data-driven software test suites scheduling process 300, according to one embodiment of the disclosure. As shown in FIG. 3, the exemplary data-driven software test suites scheduling process 300 processes the following inputs:

T—set of [N] test cases $\{t_1, t_2, t_3 \ldots t_N\}$; and

C—set of [M] constraints $\{c_1, c_2, c_3 \ldots c_M\}$.

In addition, the exemplary data-driven software test suites scheduling process 300 initializes the following parameters:

P—set of failure probabilities, corresponding to T $\{P_{t1}, P_{t2} \ldots P_{tN}\}$;

TS—the test suite, initialized as empty list of test cases;

V—a list of valid test cases (e.g., test cases that can be added to the end of the test suite TS).

A valid test case is defined as a test case that does not constrain any other test case, and a test case that does not constrain any test case that has not been added to the test suite TS.

The algorithm performed by the data-driven software test suites scheduling process 300 comprises the following steps:

While $|TS|<|T|$:

added_case=test case $[t_n]$ with minimum $[P_{tn}]$ value out of [V];

add [added_case] to the beginning of TS; and update [V] accordingly.

The exemplary data-driven software test suites scheduling process 300 generates the scheduled test suite TS, for which the scheduling aims to reduce the time until a first failed test case is detected. In one or more embodiments, the scheduled test suite TS comprises an ordering of the test cases $t_1, t_2, t_3 \ldots t_N$ in the test suite TS, based on the corresponding failure likelihoods $P_{t1}, P_{t2} \ldots P_{tN}$.

Consider a test engineering team that runs between dozens to hundreds of test suites per day, where each test suite is comprised of several test cases. Assume that 34% of the test suites contain failed test cases. The group that is considered by one or more embodiments of the exemplary data-driven software test suites scheduler 100 of FIG. 1 is the group of test suites that contain both passed and failed test cases (e.g., 31%). In this group, the data-driven software test suites scheduler 100 aims to identify the failed test cases as early as possible so time spent on running failed test suites would be reduced.

In order to understand whether there is a sufficient amount of runs for each case, the number of runs per test case is analyzed. It can be shown that although most of the test cases in the present example have been run less than 5 times, it is expected that there will be enough cases for which the failure probability can be estimated.

When considering the distribution function of the success probabilities of the test cases, it can be shown that the majority of test cases have a nearly 100% probability of being successful. However, it is important to remember that most of the test cases were run 1-5 times.

The impact of the disclosed data-driven software test suites scheduler 100 on the total run-time of a single week can be evaluated by running the following experiment:

estimate the failure probability and its variance for each test case by using all the test runs prior to a particular week;

for each test suite that has been executed during the particular week, order the test cases in three different settings:

1. original order (based on test run timestamps);
2. probability-based order (e.g., test cases that are more likely to fail are prioritized); and
3. priority-based order (e.g., test priority is also given at the dataset where there are three levels of priority (1-3), given manually by test engineers).

For each test suite, in each setting, calculate the total run-time where a single test suite run-time is the elapsed time until the first failed test is detected.

Repeat for all of the following weeks and calculate the average total run-time of the test suites for each setting, at each week.

It can be shown that the average weekly run-time of the original scheduling, the probability-based scheduling and the priority scheduling are 243.6, 134.83 and 205.9, respectively. The difference between run-time averages of the original scheduling relative to the disclosed probability-based algorithm is 108.79 hours.

Among other benefits, the disclosed data-driven software test suites scheduling techniques enable a faster identification of failed test suites by prioritizing test cases that are more likely to fail when scheduling a test suite. As noted above, the disclosed techniques for data-driven scheduling of automated software program test suites can be used in some embodiments to increase test planning efficiency, from the perspective of execution time, as well as computational resources.

One or more embodiments of the disclosure provide improved methods, apparatus and computer program products for data-driven software test suites scheduling. The foregoing applications and associated embodiments should be considered as illustrative only, and numerous other embodiments can be configured using the techniques disclosed herein, in a wide variety of different applications.

It should also be understood that the disclosed test suites scheduling techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for data-driven software test suites scheduling may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based data-driven software test suites scheduler 100, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based data-driven software test suites scheduling platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. These platforms may also be used to implement at least portions of other information processing systems in other embodiments.

Figure 4:
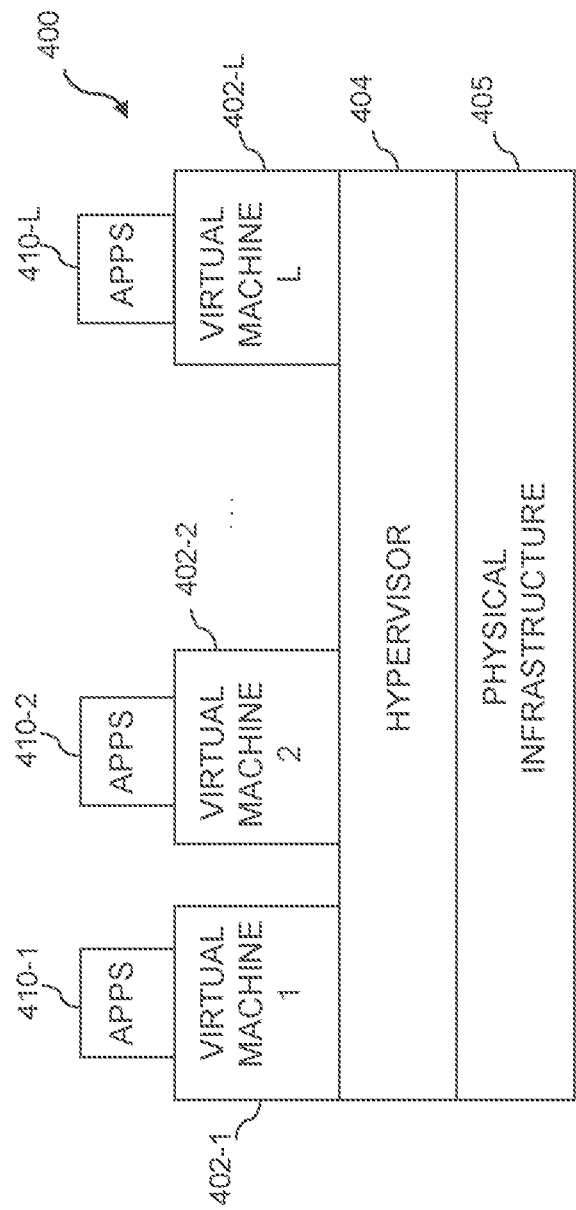
FIG. 4 illustrates an exemplary processing platform that may be used to implement at least a portion of one or more embodiments of the disclosure comprising a cloud infrastructure.

Referring now to FIG. 4, one possible processing platform that may be used to implement at least a portion of one or more embodiments of the disclosure comprises cloud infrastructure 400. The cloud infrastructure 400 in this exemplary processing platform comprises virtual machines (VMs) 402-1, 402-2, . . . 402-L implemented using a hypervisor 404. The hypervisor 404 runs on physical infrastructure 405. The cloud infrastructure 400 further comprises sets of applications 410-1, 410-2, . . . 410-L running on respective ones of the virtual machines 402-1, 402-2, . . . 402-L under the control of the hypervisor 404.

The cloud infrastructure 400 may encompass the entire given system or only portions of that given system, such as one or more of client, servers, controllers, or computing devices in the system.

Although only a single hypervisor 404 is shown in the embodiment of FIG. 4, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 404 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products.

Particular types of storage products that can be used in implementing a given storage system of the cloud-based data-driven software test suites scheduler 100 in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed cloud-based test suites scheduling apparatus may each run on a computer, server, storage device or other processing platform element. A given such element may be viewed as an example of what is more generally referred to herein as a "processing device." The cloud infrastructure 400 shown in FIG. 4 may represent at least a portion of one processing platform.

Another example of a processing platform is processing platform 500 shown in FIG. 5. The processing platform 500 in this embodiment comprises at least a portion of the given system and includes a plurality of processing devices, denoted 502-1, 502-2, 502-3, . . . 502-K, which communicate with one another over a network 504. The network 504 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 502-1 in the processing platform 500 comprises a processor 510 coupled to a memory 512. The processor 510 may comprise a microprocessor, a microcontroller, an application specific integrated circuit (ASIC), a field programmable gate array (FPGA) or other type of processing circuitry, as well as portions or combinations of such circuitry elements, and the memory 512, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 4 or 5, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining a plurality of test cases that test one or more software programs;
   obtaining dependencies among two or more of the plurality of test cases, wherein the dependencies among the two or more test cases comprise an indication of whether a given identified test case constrains one or more additional test cases;
   obtaining a failure likelihood for each of the plurality of test cases, wherein the failure likelihood for at least one of the plurality of test cases is calculated using a Bayesian inference that calculates a generalized weighted probability for the at least one test case using a weight based at least in part on a number of prior executions of the at least one test case; and
   scheduling, using at least one processing device, an execution of a plurality of the test cases in a particular order based at least in part on the failure likelihoods and the dependencies such that the given identified test case is executed before the one or more additional test cases, wherein the failure likelihoods and the dependencies are distinct from one another.

2. The method of claim 1, wherein the failure likelihoods are based on historical test data.

3. The method of claim 1, wherein the scheduling is further based on one or more of (i) test cases that were already scheduled and (ii) one or more portions of the one or more software programs that were modified.

4. The method of claim 1, wherein test cases that are more likely to fail are scheduled before test cases that are less likely to fail.

5. The method of claim 1, further comprising the step of assessing the failure likelihoods of the plurality of test cases using one or more machine learning techniques.

6. The method of claim 1, further comprising obtaining priorities among two or more of the plurality of test cases from a user and wherein the scheduling is further based on the priorities.

7. The method of claim 1, wherein the failure likelihoods are estimated using one or more parameters obtained by conducting a grid search over a dataset of prior test suites to find values of the one or more parameters that substantially minimize a run-time over the prior test suites.

8. The method of claim 1, wherein the failure likelihoods are estimated using one or more parameters configured by a user.

9. A system, comprising:
   a memory; and
   at least one processing device, coupled to the memory, operative to implement the following steps:
   obtaining a plurality of test cases that test one or more software programs;
   obtaining dependencies among two or more of the plurality of test cases, wherein the dependencies among the two or more test cases comprise an indication of whether a given identified test case constrains one or more additional test cases;
   obtaining a failure likelihood for each of the plurality of test cases, wherein the failure likelihood for at least one of the plurality of test cases is calculated using a Bayesian inference that calculates a generalized weighted probability for the at least one test case using a weight based at least in part on a number of prior executions of the at least one test case; and
   scheduling, using at least one processing device, an execution of a plurality of the test cases in a particular order based at least in part on the failure likelihoods and the dependencies such that the given identified test case is executed before the one or more additional test cases, wherein the failure likelihoods and the dependencies are distinct from one another.

10. The system of claim 9, wherein test cases that are more likely to fail are scheduled before test cases that are less likely to fail.

11. The system of claim 9, further comprising the step of assessing the failure likelihoods of the plurality of test cases using one or more machine learning techniques.

12. The system of claim 9, further comprising obtaining priorities among two or more of the plurality of test cases from a user and wherein the scheduling is further based on the priorities.

13. The system of claim 9, wherein the failure likelihoods are estimated using one or more parameters obtained by conducting a grid search over a dataset of prior test suites to find values of the one or more parameters that substantially minimize a run-time over the prior test suites.

14. The system of claim 9, wherein the failure likelihoods are estimated using one or more parameters configured by a user.

15. A computer program product, comprising a non-transitory machine-readable storage medium having encoded therein executable code of one or more software programs, wherein the one or more software programs when executed by at least one processing device perform the following steps:
   obtaining a plurality of test cases that test one or more software programs;
   obtaining dependencies among two or more of the plurality of test cases, wherein the dependencies among the two or more test cases comprise an indication of whether a given identified test case constrains one or more additional test cases;
   obtaining a failure likelihood for each of the plurality of test cases, wherein the failure likelihood for at least one of the plurality of test cases is calculated using a Bayesian inference that calculates a generalized weighted probability for the at least one test case using a weight based at least in part on a number of prior executions of the at least one test case; and
   scheduling, using at least one processing device, an execution of a plurality of the test cases in a particular order based at least in part on the failure likelihoods and the dependencies such that the given identified test case is executed before the one or more additional test cases, wherein the failure likelihoods and the dependencies are distinct from one another.

16. The computer program product of claim 15, wherein test cases that are more likely to fail are scheduled before test cases that are less likely to fail.

17. The computer program product of claim 15, further comprising the step of assessing the failure likelihoods of the plurality of test cases using one or more machine learning techniques.

18. The computer program product of claim 15, further comprising obtaining priorities among two or more of the plurality of test cases from a user and wherein the scheduling is further based on the priorities.

19. The computer program product of claim 15, wherein the failure likelihoods are estimated using one or more parameters obtained by conducting a grid search over a dataset of prior test suites to find values of the one or more parameters that substantially minimize a run-time over the prior test suites.

20. The computer program product of claim 15, wherein the failure likelihoods are estimated using one or more parameters configured by a user.

* * * * *